US009900798B2

United States Patent
Bergquist et al.

(10) Patent No.: US 9,900,798 B2
(45) Date of Patent: Feb. 20, 2018

(54) POLLING AND REPORTING MECHANISM

(71) Applicant: Telefonaktiebolaget L M Ericsson (publ), Stockholm (SE)

(72) Inventors: Gunnar Bergquist, Kista (SE); Anna Larmo, Espoo (FI); Samir Shah, Ottawa (CA); Riikka Susitaival, Helsinki (FI); Mikael Wittberg, Uppsala (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 14/897,993

(22) PCT Filed: Jun. 19, 2013

(86) PCT No.: PCT/SE2013/050737
§ 371 (c)(1),
(2) Date: Dec. 11, 2015

(87) PCT Pub. No.: WO2014/204367
PCT Pub. Date: Dec. 24, 2014

(65) Prior Publication Data
US 2016/0150433 A1 May 26, 2016

(51) Int. Cl.
*H04W 24/10* (2009.01)
*H04W 74/06* (2009.01)

(52) U.S. Cl.
CPC .......... *H04W 24/10* (2013.01); *H04W 74/06* (2013.01); *Y02B 60/50* (2013.01)

(58) Field of Classification Search
CPC .................. H04W 24/10; H04W 74/06
See application file for complete search history.

(56) References Cited

U.S. PATENT DOCUMENTS 9,420,571 B2 * 8/2016 Chun ............... H04L 1/1848
2008/0285566 A1 * 11/2008 Sammour .......... H04L 1/188
370/394

(Continued)

FOREIGN PATENT DOCUMENTS

CN 101483507 A 7/2009
KR 20090116610 A 11/2009

(Continued)

OTHER PUBLICATIONS

3GPP, "3rd Generation Partnership Project; Technical Specification Group Radio Access Network; Evolved Universal Terrestrial Radio Access (E-UTRA); Radio Link Control (RLC) protocol specification (Release 11)", 3GPP TS 36.322 V11.0.0, Sep. 2012, 1-39.

(Continued)

*Primary Examiner* — Yemane Mesfin
*Assistant Examiner* — Henry Baron
(74) *Attorney, Agent, or Firm* — Murphy, Bilak & Homiller, PLLC

(57) ABSTRACT

Methods, devices, and computer program products for status reporting in a network are provided. In some embodiments, mechanisms to delay responding to a received request for status information ("a polling request") or the triggering or transmission of a status message caused by a reception of a polling request, or to delay the triggering or transmission of the polling request itself are provided, such that redundant transmissions maybe be minimized and power consumption may be optimized.

16 Claims, 12 Drawing Sheets

(56) References Cited

U.S. PATENT DOCUMENTS

| | | |
|---|---|---|
| 2009/0046695 A1 | 2/2009 | Jiang et al. |
| 2009/0086704 A1 | 4/2009 | Ho et al. |
| 2009/0103445 A1* | 4/2009 | Sammour ............. H04L 1/1812 370/252 |
| 2010/0118857 A1* | 5/2010 | Chun .................... H04L 1/1685 370/346 |
| 2012/0269074 A1 | 10/2012 | Sågfors et al. |
| 2015/0201458 A1* | 7/2015 | Zheng ................... H04W 76/06 370/329 |

FOREIGN PATENT DOCUMENTS

| | | |
|---|---|---|
| WO | 2009132276 A2 | 10/2009 |
| WO | 2013042885 A1 | 3/2013 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.0.0 (Jun. 2012), Jun. 2012, 1-302.

* cited by examiner

POLLING AND REPORTING MECHANISM

TECHNICAL FIELD

This disclosure relates generally to improving transmission quality and/or energy efficiency in networks and, more particularly, to methods, devices, and computer program products for polling and status reporting in a wireless network.

BACKGROUND

3GPP Long Term Evolution (LTE) is a standard for mobile device network technology. LTE is a set of enhancements to the Universal Mobile Telecommunications System (UMTS), and is a technology for realizing high-speed packet-based communication that can reach high data rates on both downlink and uplink channels.

The current Radio Link Control (RLC) protocol in LTE and HSPA defines a polling bit, which triggers a status message transmission in the receiver peer, unless it has already been triggered. Typically, the status message will be transmitted back to the transmitter peer immediately, or as soon as possible. However, if either a reordering timer or a status prohibit timer is running, the transmission of the status may be delayed. The reordering timer may be started, for instance, whenever a gap in sequence numbers is detected and its expiration may trigger a status report to be sent from the receiver peer to the transmitter peer. The status prohibit timer is started whenever a status is sent.

The 3GPP specification provides a description of polling in an Acknowledged Mode (AM) receiver. For instance, 3GPP TS 36.322, Evolved Universal Terrestrial Radio Access (E-UTRA); Radio Link Control (RLC) protocol specification, version 11.0.0, sub-clause 5.2 specifies the Automatic Repeat-reQuest (ARQ) procedures used for AM data transfer. As described in the standard's specification, the AM RLC entity polls its peer AM RLC entity in order to trigger STATUS reporting at the peer. Upon assembly of a new Acknowledged Mode Data (AMD) Protocol Data Unit (PDU), the transmitting side of an AM RLC will increment the value of "PDU_WITHOUT_POLL" by one, and increment the value of "BYTE_WITHOUT_POLL" by the number of contained bytes. If either PDU_WITHOUT_POLL is greater than or equal to a value, pollPDU, or the counter "BYTE_WITHOUT_POLL" is greater than or equal to a value, "pollByte," a poll will be triggered. Further, if both the transmission buffer and the retransmission buffer are emptied, or if no new RLC data PDU can be transmitted, e.g., due to window stalling, or a counter t-PollRetransmit expiring, while conditions for "Last Data Poll" persist, a poll will be triggered. According to the standard, the RLC AM entity maintains a variable RETX_COUNT to count the number of retransmissions of an AMD PDU. Presently, there is one RETX_COUNT counter per PDU that is retransmitted.

The pollPDU and pollByte are optional thresholds which are configured by the radio resource layer in the evolved nodeB (eNodeB), using Radio Resource Control (RRC) signalling to configure the transmitter in the user equipment (UE). These thresholds are set per each RLC AM entity. The transmitting side of an RLC AM entity will start or restart t-PollRetransmit each time it delivers a PDU including a poll to a lower layer, i.e., the timer is (re)started on the transmission occasion. At the same time, the entity remembers the sequence number (SN) of the PDU for which the poll was set, as outlined in 3GPP TS 36.322, subclause 5.2.2.1 ("set POLL_SN to VT(S)—1"). The t-PollRetransmit timer is stopped upon reception of a STATUS report comprising either a positive or a negative acknowledgement for the RLC data PDU with sequence number equal to POLL_SN. A positive acknowledgement (confirmation of successful reception) is used to advance the transmitter window and to send an indication of successful delivery to higher layers. A negative acknowledgement (notification of reception failure) will make the transmitter retransmit, thereby restarting the timer as described above. This occurs only if the SN of the corresponding RLC PDU is within the transmitter window. For instance, it could have been already acknowledged and used to advance the transmitter window. Also, the above only occurs if the RETX_COUNT has not exceeded the maxRetxThreshold that corresponds to the PDU.

In Section 5.2.3, 3GPP TS 36.322 also provides a description of status reporting. The acknowledgements of received PDUs or byte segments of PDUs are sent in Status Reports. There are two types of triggers for such reporting.

Transmitter triggers: The receiver may be explicitly polled by the transmitter as described above. The transmitter's aim is to progressively report successful delivery to higher layers and advance its transmission window. It cannot do that without continuous feedback from the receiver (positive acknowledgements).

Receiver triggers: The receiver itself may trigger status reporting when detecting a reception failure, appearing as a gap in the SNs of successfully received PDUs. The receiver's aim is to progressively advance its receiving window by reassembling SDUs for further delivery through higher layers. The gap effectively hinders it from delivering out-of-order SDUs. The gap cannot be filled unless the transmitter performs retransmission of the missing parts. Thus, the receiver supervises the occurrence of one or more gaps with a timer, t-Reordering, which is set proportionately to avoid short-cutting retransmission schemes of lower layers. Status reporting will be triggered if the gap still occurs at the time of t-Reordering's expiration. The timer is stopped when gap(s) cease to exist.

The RLC receiver sends a STATUS PDU if each of the following are fulfilled:
  status reporting is triggered (as described above);
  it is allowed to send status (t-StatusProhibit is not running); and
  a transmission opportunity is provided.

The receiving side of an RLC AM entity will start or restart the t-StatusProhibit timer each time it delivers a PDU, including status to lower layer. In other words, the timer is (re)started with the transmission occasion. Values for t-StatusProhibt are enumerated in 3GPP 36.331.

3GPP 36.322, Section 6.2.2.11 describes a Polling bit (P) field. Presently, the P field indicates whether or not the transmitting side of an AM RLC entity requests a STATUS report from its peer AM RLC entity. Specifically, a Status Report is requested if P=1. The poll is sent by sending a message with the P bit set in the RLC PDU or RESEG PDU header based on triggers described above. The poll is usually sent along with the transmission of a new data PDU. The poll may also be sent along with a retransmission of a previously sent AMD PDU or RESEG PDU if the "Last Data Poll" trigger is activated, i.e., no new data can be sent.

SUMMARY

According to some embodiments, methods, devices, and computer program products have been developed that provide mechanisms for polling and reporting status in a network.

In many communication systems, the control procedures that are frequently performed are of a request-respond type, for instance, on the signaling radio bearers (SRB1 or SRB2) in LTE. For example, according to a request-response model, a base station, such as an evolved Node B (eNodeB), may request that a wireless communication device, such as a UE, perform an action and then wait for a confirmation that the action has been completed.

On the lower layers, such as, for example, the Radio Link Control (RLC) layer in a Control Plane Stack or a User Plane Stack, there are protocols that operate in such a request-respond manner. For instance, on the RLC layer when the Acknowledged Mode (AM) is used, the transmitter and receiver use mechanisms called polling and status reporting to inform each other on their respective transmission and reception statuses. Since the processing times are different on the different layers (longer in the higher up layers of the protocol stack, typically) the different requests and responses cause the UE to make several separate transmissions to inform the different protocol layers of the reception status. This behavior may cause redundant access requests on the random access channel or otherwise and increased power consumption in general.

According to some embodiments, mechanisms to delay responding to a received request for status information ("a polling request") or the triggering or transmission of a status message caused by a reception of a polling request, or to delay the triggering or transmission of the polling request itself are provided, such that redundant transmissions may be minimized, power consumption may be optimized, and network load may be reduced, for instance, load on the random access channel of an eNodeB.

In some embodiments, a method for reporting status in a network is provided, which includes receiving, at a control entity of a first stack layer of a first device, a first message from a second device that comprises a set of data and an indicator requesting status information. The method also includes determining, at the control entity, status information of the first device and obtaining a second set of data from a second stack layer of the first device. The method also includes transmitting, from the control entity, a response message to the second device in response to a transmission triggering event, where the response message comprises both the status information and at least a portion of the second set of data. The response message may be, for example, a concatenation of the status information and a portion of the second set of data.

In some embodiments, the method may further comprise starting or resetting a timer of the first device in response to receiving the first message, such as a status prohibit timer, a reordering timer, or a status reporting delay timer. According to some aspects, the transmission triggering event of the method may be a specified time lapse of expiration of the timer.

In some embodiments, a device comprising a processor and a memory is provided, and the memory contains instructions executable by the processor whereby the device is operative to receive, at a control entity of a first stack layer of the device, a first message from a second device that comprises a set of data and an indicator requesting status information. The device is operative to determine, at the control entity, status information of the device and obtain a second set of data from a second stack layer. The device is also operative to transmit a response message to the second device in response to a transmission triggering event, where the response message comprises both the status information and at least a portion of the second set of data. The response message may be, for example, a concatenation of the status information and a portion of the second set of data.

In some embodiments, a device for reporting status in a network is provided. The device includes means to receive, at a control entity of a first stack layer of the device, a first message from a second device that comprises a set of data and an indicator requesting status information. The device also includes means to determine, at the control entity, status information of the device and obtain a second set of data from a second stack layer. The device also includes means to transmit a response message to the second device in response to a transmission triggering event, where the response message comprises both the status information and at least a portion of the second set of data. The response message may be, for example, a concatenation of the status information and a portion of the second set of data.

In some embodiments, a computer program product including a non-transitory computer readable medium storing computer instructions for reporting status in a network is provided. The product includes instructions for receiving, at a control entity of a first stack layer of a first device, a first message from a second device that comprises a set of data and an indicator requesting status information. The product also includes instructions for determining, at the control entity, status information of the first device and obtaining a second set of data from a second stack layer of the first device. The product also includes instructions for transmitting, from the control entity, a response message to the second device in response to a transmission triggering event, where the response message comprises both the status information and at least a portion of the second set of data. The response message may be, for example, a concatenation of the status information and a portion of the second set of data.

According to some embodiments, the triggering and transmission of status reporting is delayed from the time of poll reception such that it occurs in coordination with the response to a request message contained in a higher layer's payload in the received message tagged with the poll. Further, techniques may include delaying the status reporting based on a timer which is started or restarted at the reception of the poll. Further, techniques may include delaying the status reporting until the arrival of a subsequent message in the reverse direction and having the status reporting concur with that message. Delaying the status reporting may be based on the reception of a special-purpose poll bit. Alternatively, delaying the status reporting may be accomplished by delaying the poll to be sent. Delaying the status reporting by delaying the poll may be based on a timer that is started (or restarted) at the transmission of the PDU that contains the request. Further, techniques may include delaying the status reporting by delaying the poll until the arrival of a subsequent message in the forward direction, and having the delayed poll concur with that message.

In some embodiments, a method for polling in a network is provided that comprises transmitting, from a control entity of a first device to a second device, a first data message comprising a first set of data. The method further comprises initiating a timer in response to the transmitting of the first data message, and after an expiration or specified time lapse of the timer, transmitting a polling request to the second device, where the polling request is included in an Acknowledged Mode Data (AMD) Protocol Data Unit (PDU), or PDU segment, or polling request PDU. The method also includes receiving, at the control entity from the second device, a response message comprising a concatenation of a second set of data responsive to the first set of data and status information of the second device.

In some embodiments, a method for requesting status in a network is provided. The method comprises obtaining, at a control entity of a first device, a first set of data and transmitting, from the control entity to a second device, a first message comprising the first set of data and a status request. The method also includes receiving, at the control entity from the second device, a response message comprising a concatenation of a second set of data responsive to the first set of data and status information of the second device.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods, devices, and computer program products for polling and status reporting techniques that avoid redundant accesses by network devices to report status and response messages separately for different protocol layers, thereby reducing network load and improving power efficiency. The disclosed techniques may be applicable, for instance, to delay status reporting from a wireless communication device (WCD), as well as a network or control node.

Figure 1:
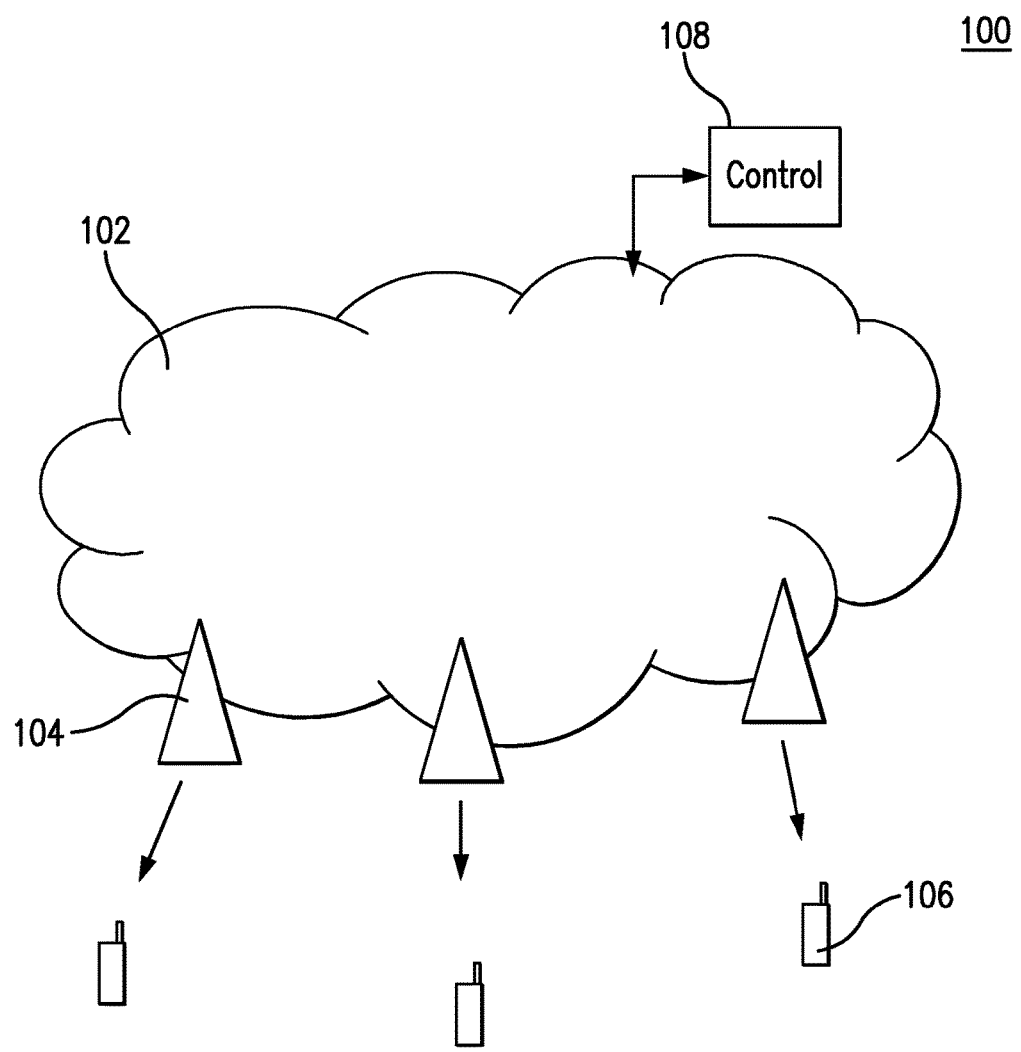
FIG. 1 is an illustration of a wireless communication system in accordance with exemplary embodiments.

Referring to FIG. 1, a wireless communication deployment 100 in accordance with exemplary embodiments includes an access node 104 serving a wireless communication device (WCD) 106. Examples of WCDs include, but are not limited to, mobile telephones, user equipments (UEs), personal digital assistants, electronic readers, portable electronic tablets, wireless sensors, machine communication devices, personal computers, and laptop computers. Access node 104 may be, for example, a base station, an eNodeB, relay node, or gateway type device, and is capable of communicating with device 106, along with any additional elements suitable to support wireless communication between wireless communication devices or between a wireless communication device and another communication device, such as landline telephone. The access node 104 may be in communication with, for instance via a network 102, one or more control nodes 108, such as a Radio Network Controller (RNC), a Mobility Management Entity (MME), a Mobile Switching Center (MSC) or Base Station Subsystem (BSS). Although node 108 is explicitly identified as a control node, each of nodes 104, 106, and 108 may be understood as a "control" node to the extent that it includes a control unit or otherwise implements control functions.

Figure 2A:
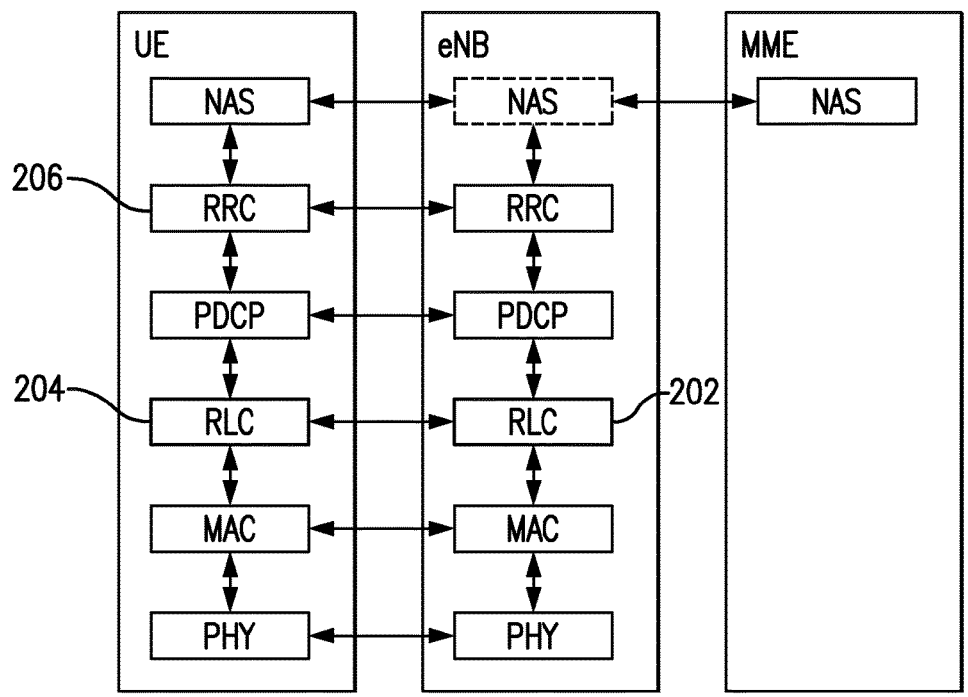
FIG. 2A is an illustration of an exemplary control plane stack.
Figure 2B:
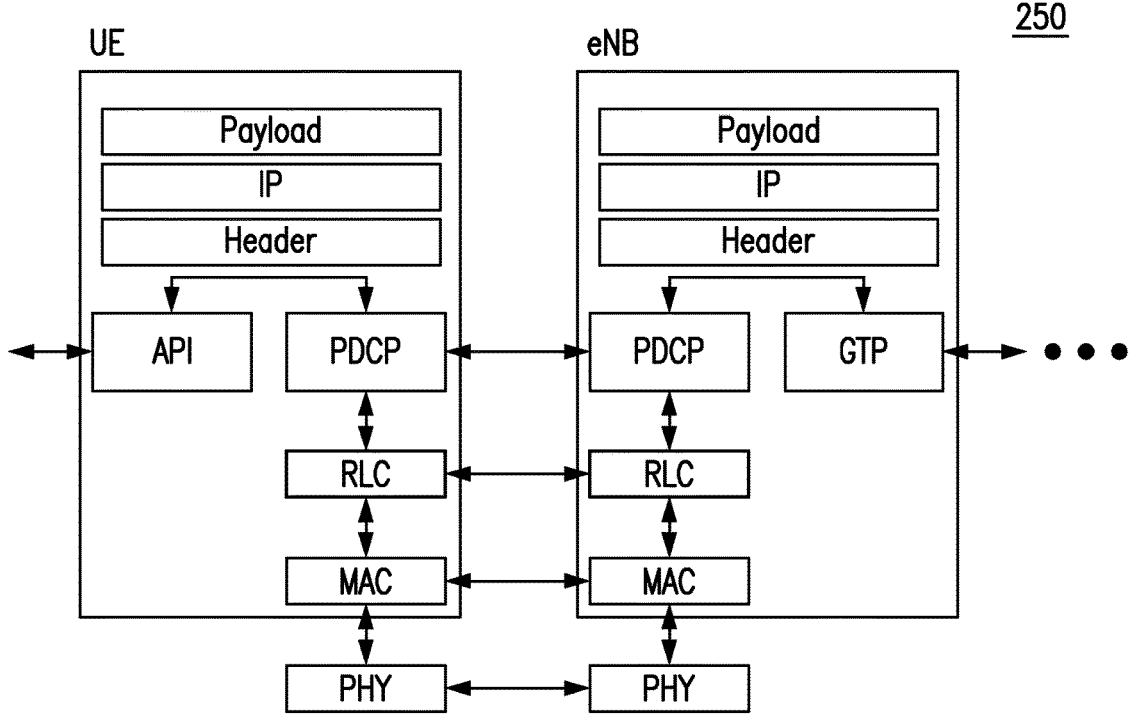
FIG. 2B is an illustration of an exemplary user plane stack.

FIGS. 2A and 2B illustrate stacks for the control plane and user plane respectively. FIG. 2A illustrates an exemplary control plane stack 200 of a UE, eNB, and MME. These devices could correspond, for instance, to the WCD 106, access node 104, and control node 108 shown in FIG. 1. FIG. 2B illustrates an exemplary user plane stack 250 for the UE 106 and eNodeB 104. Signaling, such as data and other messages, may be communicated between layers of the stacks, and between stack entities of peer devices. For instance, PDUs may be communicated between the same layer of different devices, while Service Data Units (SDUs) may be communicated between different layers of the same device. For instance, a PDU may be transmitted from the RLC entity 202 of the eNodeB 104 to the RLC entity 204 of the UE 106 as shown in FIG. 2A, while an SDU could be obtained by the RLC entity 204 of the UE 106 from a higher layer, such as the RRC layer 206.

Figure 3:
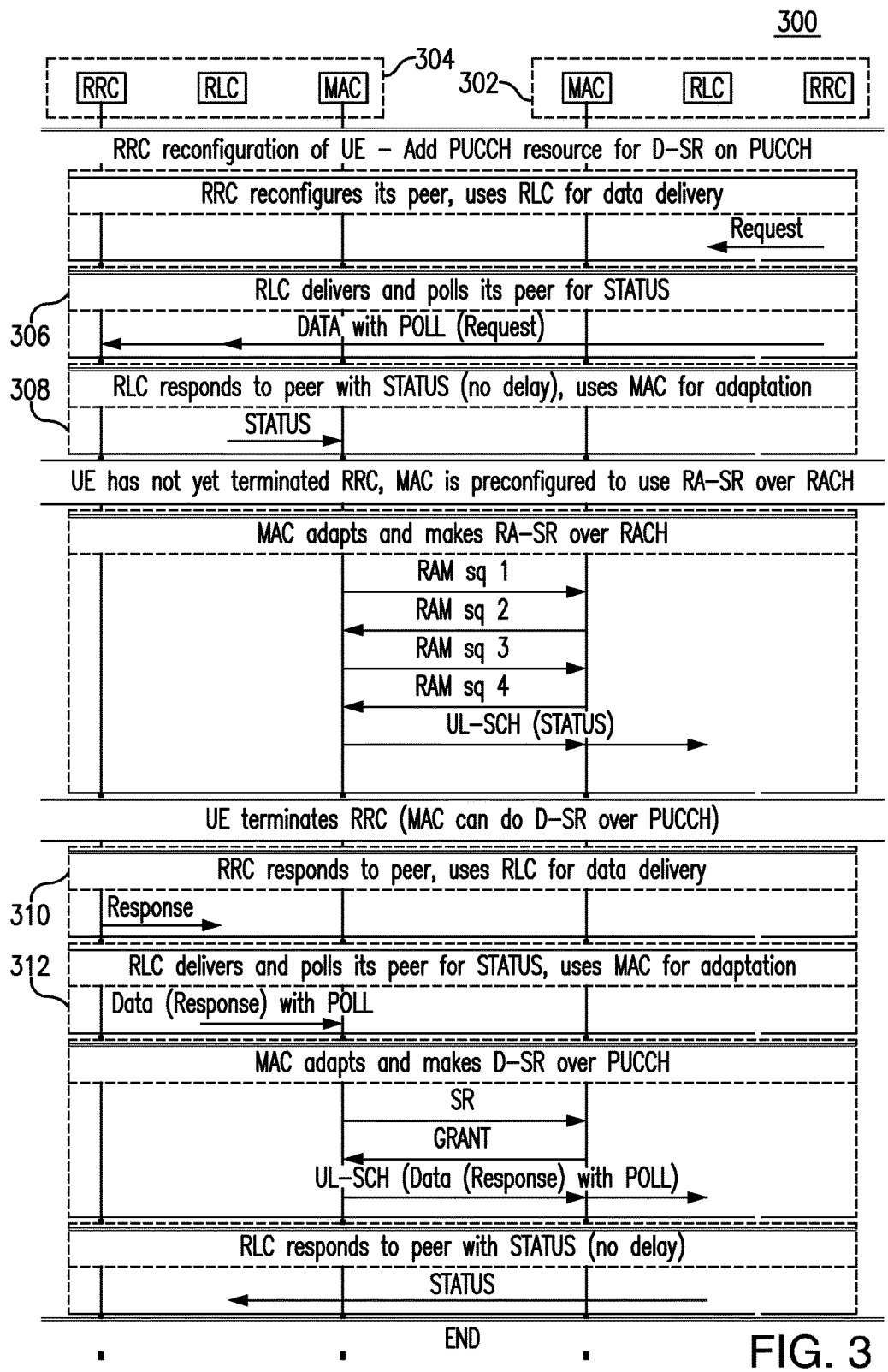
FIG. 3 is an exemplary request-response transmission sequence diagram.

FIG. 3 is a two-layered request-response transmission sequence diagram 300 illustrating communications involving an RRC and RLC entity according to present techniques. In this example, a first device 302 and a second device 304 are in communication. Device 302 may be, for example, an access node 104 such as an eNodeB, while device 304 may be a WCD 106, such as a UE. In this example, each device 302,304 includes an RRC, RLC, and MAC layer. At sequence 306, device 304 receives an RLC transmission that includes data and a request for status information ("poll"). At sequence 308, the device 304 RLC responds to device 302 with its status, without introducing a delay and using the MAC layer for adaption. At sequence 310, the RRC layer responds to peer device 302, using the RLC layer for delivery. At sequence 312, the RLC delivers the data response, using the MAC for adaption. In comparison to the embodiments disclosed herein, sequence 300 includes an inefficient use of resources by having a redundant RLC transmission back to device 302 in order to report status.

The 3GPP 36.322 RLC AM provides information regarding, inter alia, RLC entities, RLC data PDUs, and AMD PDUs. For instance, an AMD PDU may be used to transfer upper layer data by an AM RLC entity. It is used when the AM RLC entity transmits the upper layer PDUs for the first time, or when the AM RLC entity retransmits an AMD PDU without having to perform re-segmentation. Presently, the AMD PDU used by 3GPP LTE consists of a Data field and an AMD PDU header, as illustrated in FIG. 4A. 3GPP 36.322 also lists additional formats for the AMD PDU, with for instance, an LI field.

The specification also describes an AMD PDU segment, often referred to as RESEG PDU, which is used to transfer upper layer data by an AM RLC entity. It is used when the AM RLC entity needs to retransmit a portion or "segment"

of an AMD PDU. Like the AMD PDU, the AMD PDU segment has a Data field and an AMD PDU segment header, as illustrated in FIG. 4B. Again, 3GPP 36.322 lists additional formats for the AMD PDU segment, with for instance, and LI field.

Figure 4A:
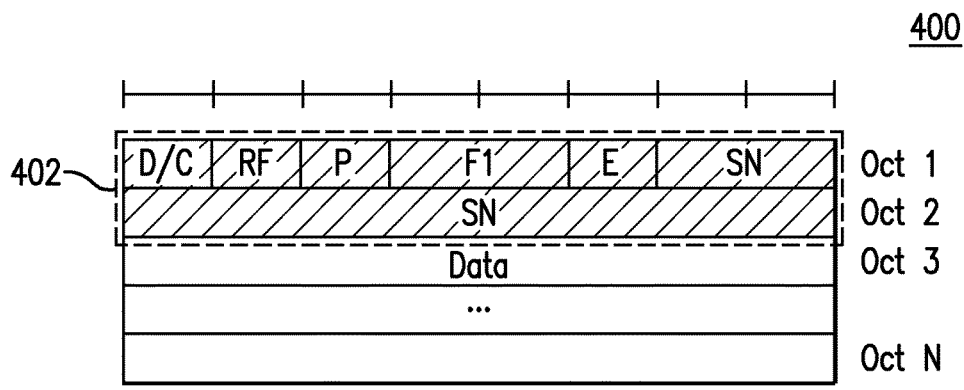
FIGS. 4A-4C illustrate data formats in accordance with exemplary embodiments.
Figure 4B:
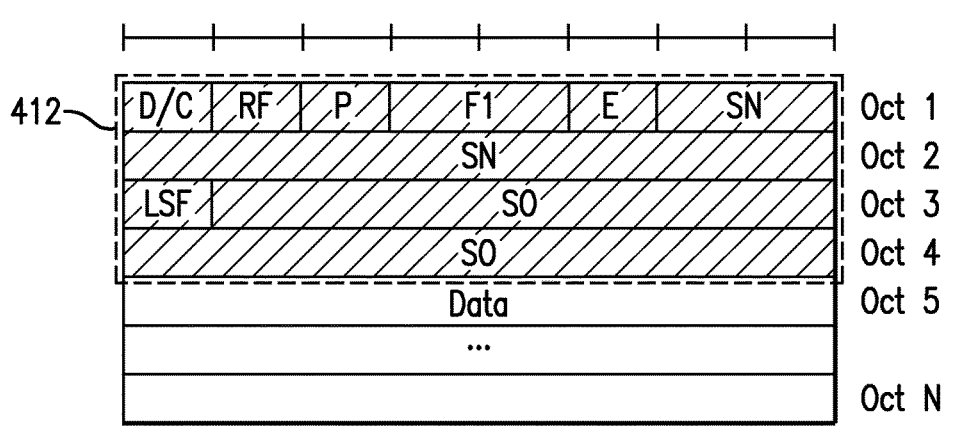
Figure 4C:
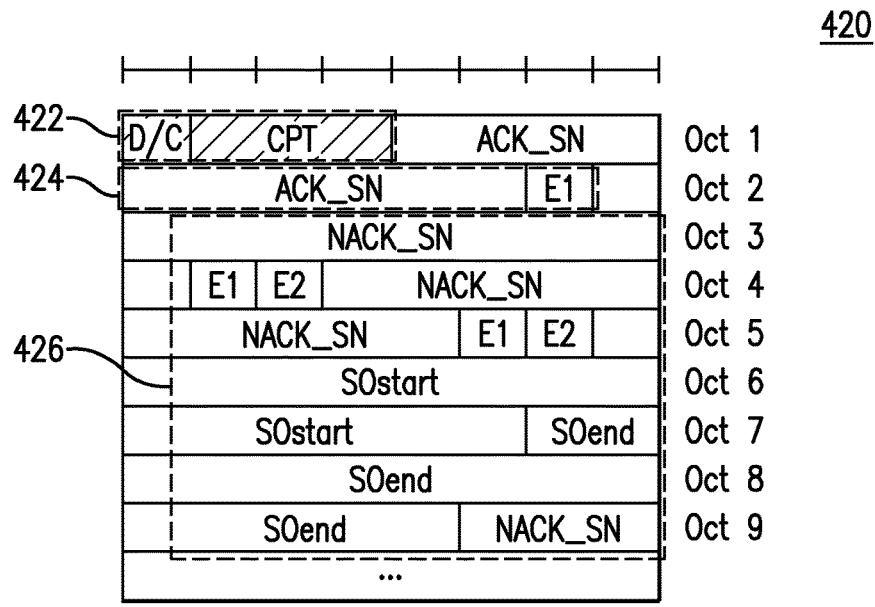

The 3GPP 36.322 also provides for a PDU header, for instance, as shown in FIG. 4A. FIG. 4A illustrates an exemplary AMD PDU format 400 in accordance with the specification, while FIG. 4B illustrates an exemplary AMD PDU segment format 410, and FIG. 4C illustrates an exemplary Status PDU format 420. The header of an AMD PDU consists of a "fixed" part 402, i.e., the fields that are present for every AMD PDU, and an "extension" part—the fields that are absent when not necessary (not shown). The fixed part of the AMD PDU header is byte aligned and consists of a D/C, an RF, a P, an FI, an E and an SN field. The extension part of the AMD PDU header is byte aligned and may consist of, for instance, E(s), LI(s), and occasionally "padding." The extension part may be used when successive upper layer PDUs or parts of such PDUs are concatenated.

Similarly, as illustrated in FIG. 4B, the header of an AMD PDU segment has a fixed part 412 and a possible extension part (not shown). The first two bytes of the header are structured in the same way as the header of an AMD PDU. The next two bytes of the fixed part are byte aligned and consist of Last Segment Flag (LSF) and Segmentation Offset (SO). The extension part of the AMD PDU segment header is structured in the same way as the extension part of AMD PDU header, and may consist of, for instance, E(s), LI(s), and occasionally padding. The extension part is used to retransmit different data parts that were originally transmitted in one, and the same, AMD PDU.

An RLC control PDU may be used by the AM RLC entity to further control the ARQ procedure for control beyond what is possible from using the header fields in the RLC data PDUs. There are three ARQ procedures: Retransmission, Polling, and Status Reporting. The 3GPP LTE standard currently specifies just one RLC control PDU, the STATUS PDU. The STATUS PDU is used for status reporting. It is sent by the receiving side of an AM RLC entity to inform the peer AM RLC entity about AMD PDUs that have been received successfully, and AMD PDUs for which parts are detected as missing.

As illustrated in FIG. 4C, the header of a RLC Control PDU begins with half a byte of data 422 that is present for every RLC control PDU, consisting of a D/C and a Control Protocol Data Unit Type (CPT) field. In the case of a STATUS PDU, two further fixed fields 424 follow: ACK_SN and E1. The extension part 426 of the STATUS PDU (absent when not necessary) consists of reoccurring triplets NACK_SN, E1 and E2, each followed by a pair of SOstart and SOend (absent when not necessary). The D/C value is 0 for an RLC control PDU, as opposed to the value 1, which implicate a Data PDU. The CPT value for STATUS is 000. The values 001-111 are reserved for future use.

3GPP 36.322 also describes the concatenation of PDUs The transmitting side of an AM RLC entity will not segment an RLC SDU (or partially transmitted SDU or retransmitted RLC PDU) if the whole SDU (or partially transmitted SDU or retransmitted RLC PDU) fits into the resources provided by the lower adaption and physical transmission layers. It will always maximize the size of any segment to fill the grant to the extent possible.

Although the 3GPP specification provides numerous transmission formats and timers, such as the status prohibit timer and reordering timer, there are presently no other mechanisms that inhibit the status transmission in the RLC receive. Aspects of the present disclosure provide devices and techniques for delaying reporting status to avoid redundant transmissions and optimize power consumption. It is particularly beneficial in the above-described scenarios to hold back the status transmission even when the status prohibit timer is not running, or when the reordering timer expires, where request-respond behavior is typical for several layers, thereby forming overlaid request-respond behaviors.

Figure 5:
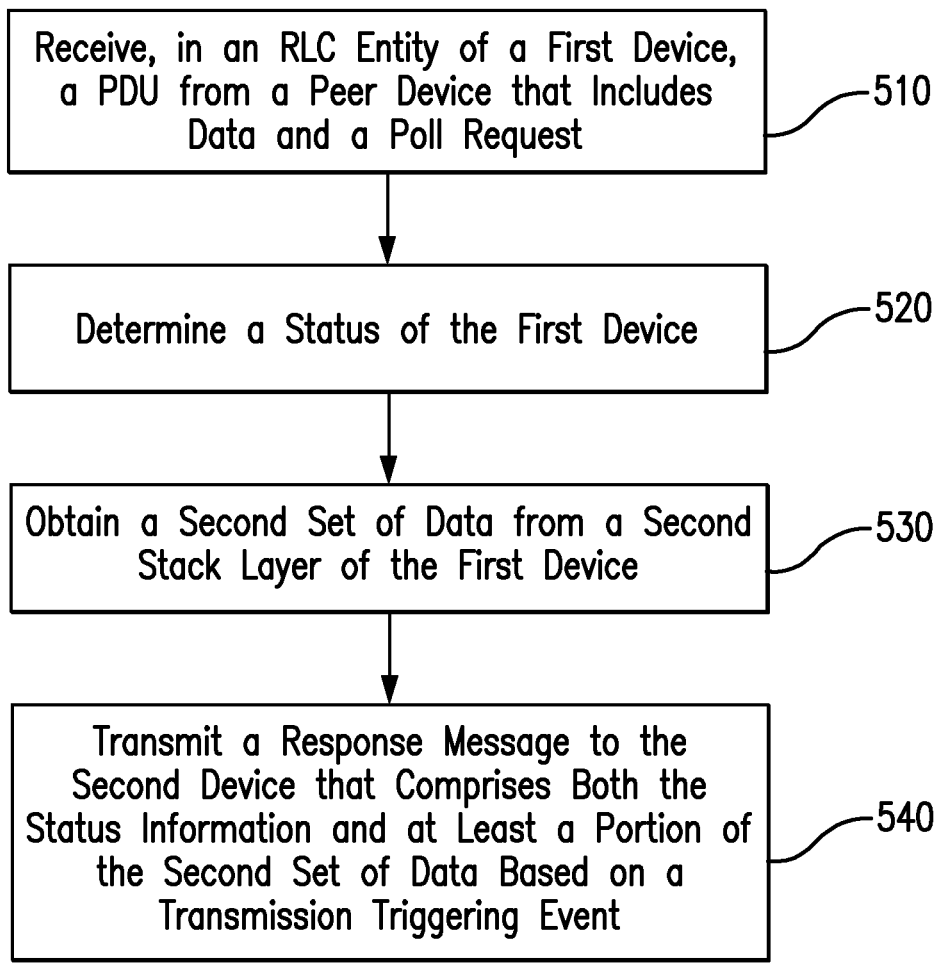
FIG. 5 is a flow chart illustrating a process in accordance with exemplary embodiments.

Referring to now to FIG. 5, a process 500 for reporting status in a network is illustrated. The process 500 may be performed, for instance, by a component of a wireless communication device, access node, or control node. For instance, the process 500 may be performed by a control entity of wireless communication device 106, access node 104, or control node 108.

In step 510, an initial message is received on a first stack layer that comprises a first set of data and data indicating a request for status information. The initial message may be received in a control entity of the first stack layer in a first device, from a second device. For instance, the first stack layer may be a Radio Link Control (RLC) layer. According to some embodiments, the first device may be a WCD, such as a UE, while the second device is a base station, such as an eNodeB.

In step 520, status information is determined. For instance, the control entity may determine the status of the first device. Status information may include, for example, either a positive or a negative acknowledgement of the receipt of a message, such as for the RLC data PDU with a certain sequence number. In some embodiments, the indicator requesting status information in step 510 may be comprised of a polling bit. The polling bit may be a part of an Acknowledged Mode Data (AMD) PDU or PDU segment. According to certain aspects, in response to the polling bit, the determination of status in step 520 may be performed only after a specified delay.

In step 530, a second set of data is obtained from a second stack layer, for instance, a second stack layer of the first device. According to some embodiments, the second stack layer may be the Radio Resource Control (RRC) layer. The second set of data may be obtained in a Service Data Unit (SDU) from the second stack layer, and in certain aspects, may be responsive to the first set of data received in step 510.

In step 540, a response message is transmitted to the second device. The response message may be, for instance, comprised of some or all of the status information determined in step 520 as well as at least a portion of the second set of data. The response message may be, for example, a concatenation of the status information and at least a portion of the second set of data. The response message may be a Protocol Data Unit (PDU) or PDU segment, such as an Acknowledged Mode Data (AMD) PDU. The transmitting step may include, for example, adaptation on a Medium Access Control (MAC) layer of the device.

According to some embodiments, the transmission of step 540 is in response to a transmission triggering event. The triggering event may be, for example, the expiration or specified time lapse of a timer. The timer that causes the triggering even may be started, or reset, in response to receiving the first message of step 510. In certain aspects, the timer may be a timer that currently exists in the LTE standards, such as the status prohibit timer or a reordering timer. Alternatively, the timer may be a timer specifically configured to delay reporting, i.e., a status reporting delay timer. The status reporting delay timer may be used to delay one or more of status determination and transmission.

In some embodiments, the device may be configured such that reception of a poll bit causes the device to check, or otherwise determine, whether a pre-defined existing timer, e.g., the status prohibit or reordering timer, is already running prior to triggering the status. According to certain aspects, if the timer is not yet running, the timer is started, and the status is triggered after the timer has expired, or a predetermined amount of time has elapsed from the existing time. If the timer is already running, it may be restarted in order to provide the necessary delay. In this configuration, a new use of existing timers causes the status transmission triggered by the poll reception to be delayed by the length, or a portion of the length, of the chosen timer.

One of ordinary skill in the art will recognize that there are multiple ways to implement the existing timers in order to achieve the desired reporting delay. For instance, one option is that the standardized behavior is changed without concern for type of bearer, i.e., that the existing status prohibit timer is started/restarted at the reception of a poll, instead of when sending a status as in the legacy system. Another option, is to define a differentiated behavior per bearer, e.g., to change the standardized behavior only for Signaling Radio Bearers (SRBs).

Yet another alternative option is to add a configuration option to RRC signaling that may be used by an access node, such as an eNodeB, to control the reporting behavior of a WCD. The configuration could be applicable for all bearers, or for certain types of bearer, e.g., SRBs or SRB1 in LTE, or there could be a separate configuration per each bearer. According to some embodiments, a default configuration has this functionality turned off.

In certain aspects, in order to effectively delay reporting to achieve conservation of resources, the timer should be large enough to effectively delay the status so that it coincides with the higher layer response, such as the second set of data received from the second stack layer in step 530. Values from the standardized range of the timer t-Status-Prohibit are non-limiting exemplary values. As outlined in 3GPP TS 36.331, these values may range from between 0 ms and 500 ms, in increments of 5 ms to 50 ms. The standard also provides for spare values.

In some embodiments, process 500 does not include the use of an existing 3GPP timer to delay reporting, rather, a new timer, referred to herein as a status reporting delay timer, is defined for delaying status triggering upon reception of a poll. This new timer may be signaled with RRC configuration and may be applicable to all bearers, or for certain types of bearer, e.g., SRBs or SRB1, or there could be a separate configuration per each bearer. In some instances, exemplary values for the new timer may range between 0 ms and 500 ms.

According to some embodiments, status triggering and transmission is delayed by introducing a new special-purpose poll bit into the RLC PDU or PDU segment header. When this new kind of delay poll bit is received, for instance, by a WCD in a message from a base station, the status reporting is only triggered after either a pre-defined (specified) or a configured delay. The poll bit may be sent in an RLC control PDU by using a new Control Protocol Data Unit Type (CPT). As illustrated, for instance, by the STATUS message of FIG. 4C, an RLC control PDU header consists of a D/C and a CPT field. The D/C value is 0 for RLC control PDU. The CPT value would be any value in the range 001-111 that is presently reserved according to the 3GPP specification.

According to some embodiments, the delayed actions upon receiving a poll are controlled by the transmitting aspects of the same RLC entity. This is in contrast to the triggering and transmission of status controlled by timers related to the receiving side of that RLC entity. The transmitting side delays the status reporting until forming and transmitting some subsequent (and new) AMD PDU or AMD PDU segment. In this case, the status is triggered upon assembly of a new AMD PDU. This will cause the status transmission triggered by the poll reception to be delayed until the next AMD PDU transmission. When these messages are concatenated, physical layer resources are saved as there are less transmitted bits and triggered random access procedures.

According to some embodiments, a new poll bit is introduced in the AMD PDU (or AMD PDU segment). This new poll bit enables different types of status reporting schemes to be used in different scenarios. Additionally, to handle cases where a response message is not sent, a maximum wait time may be defined, after which the status transmission is triggered regardless of AMD PDU transmission. This functionality may be incorporated into the triggering schemes discussed above.

For instance, according to a non-limiting example, the network may include a new poll bit in the AMD PDU including RRCConnectionReconfiguration. In this example, the receiver side (a UE in this case) triggers status reporting, but delays it until the next transmission. According to this scenario, the next transmission would likely be RRCConnectionReconfigurationComplete. In some embodiments, when this message is transmitted, the corresponding AMD PDU is concatenated with the status PDU.

Figure 6:
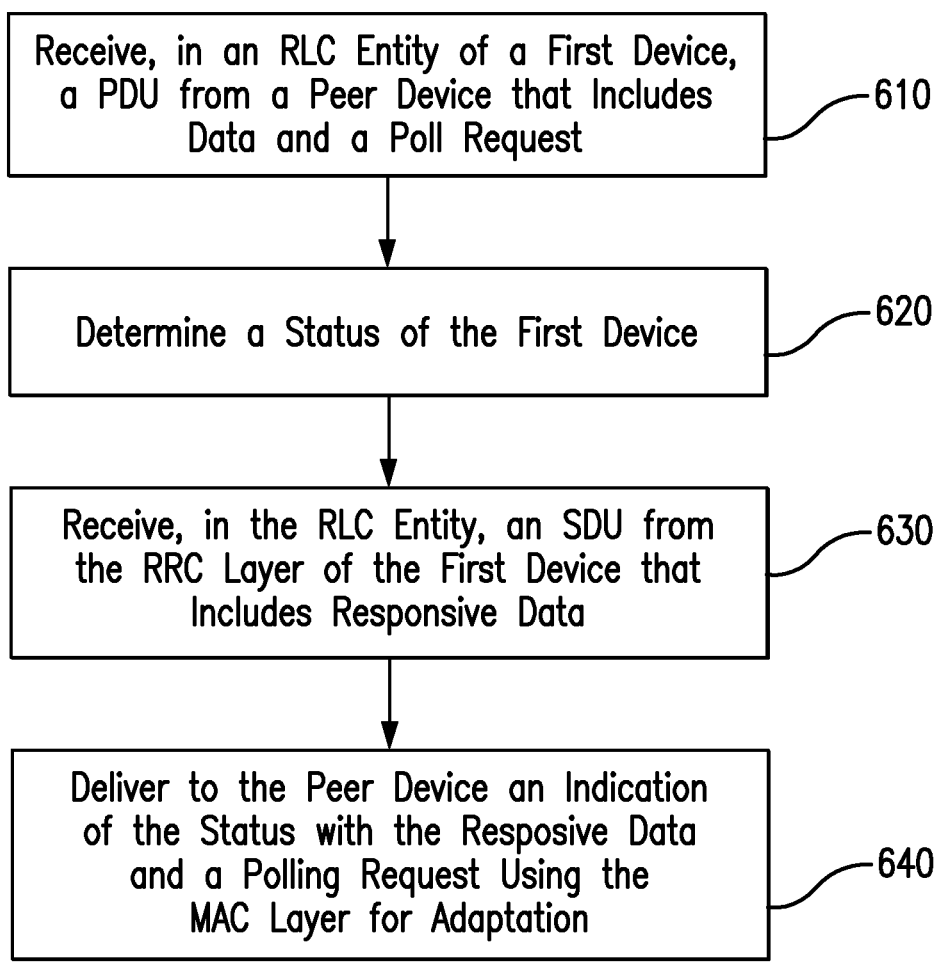
FIG. 6 is a flow chart illustrating a process in accordance with exemplary embodiments.

Referring now to FIG. 6, a process 600 for reporting status in a network is illustrated. The process 600 may be performed, for instance, by a component of a wireless communication device, access node, or control node. For instance, the process 600 may be performed by a control entity of wireless communication device 106, access node 104, or control node 108.

In step 610, an RLC entity of a first device, such as WCD 106, receives a PDU message (or segment) from a peer device, such as access node 104 or control node 108, that includes data and a poll request.

In step 620, a status of the first device is determined.

In step 630, the RLC entity receives an SDU from the RRC layer of the first device that includes data that is responsive to the data received in the PDU from the peer device. For example, the PDU of step 610 may include two parts: (1) an indicator requesting status information; and (2) a set of data that can be decoded as an RRC message by the higher level stack layers. In this example, the responsive data may be responsive to the decoded RRC message.

In step 640, the first device delivers to the peer device an indication of its status along with the responsive data, for example, using the MAC layer for adaption. The response may also include a polling request.

Figure 7:
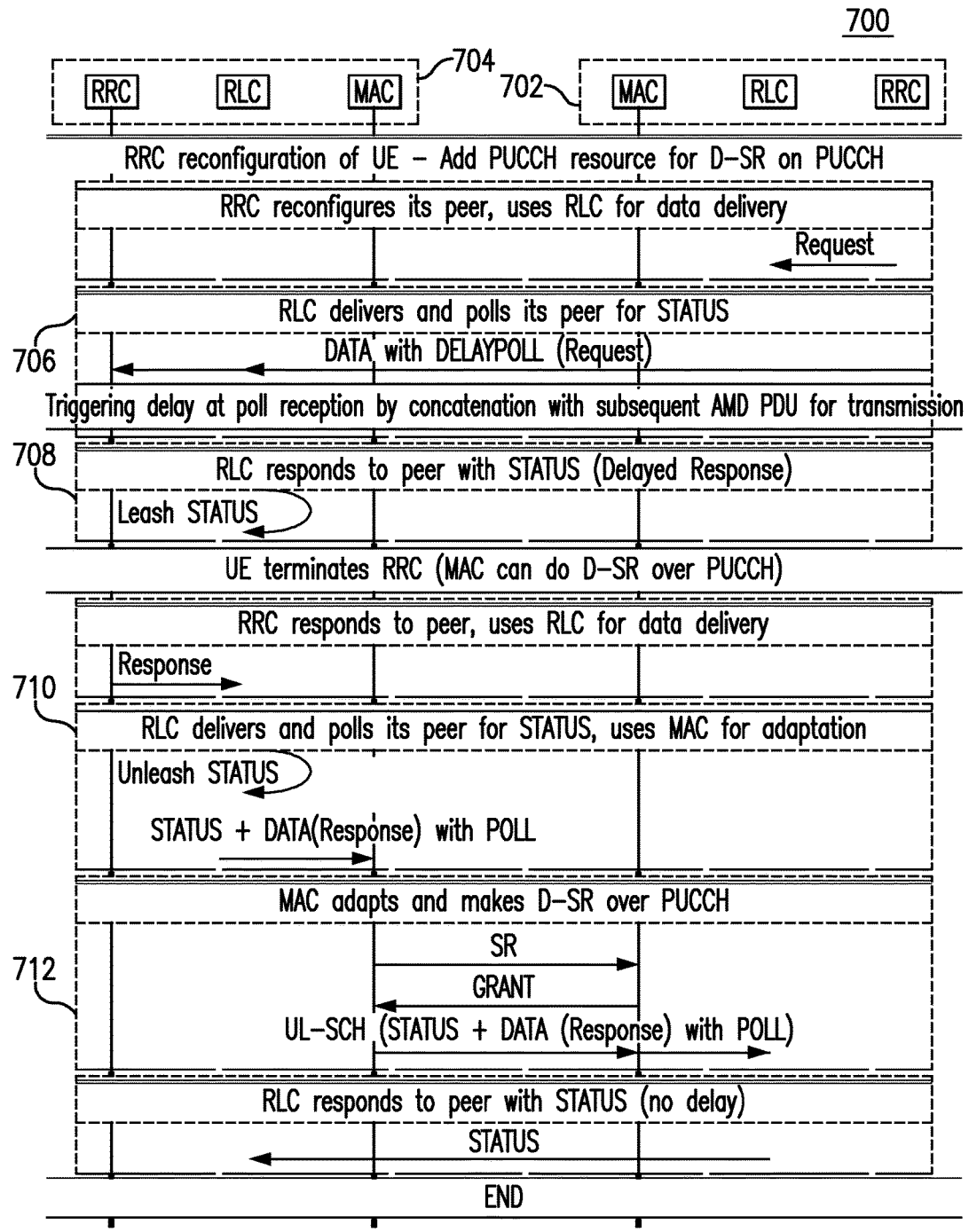
FIG. 7 is a request-response transmission sequence diagram in accordance with exemplary embodiments.

Certain aspects of processes 500 and 600 may be understood with respect to the request-response transmission sequence diagram of FIG. 7. Request-response transmission sequence diagram 700 illustrates communications involving an RRC and RLC according to techniques disclosed herein. In this example, a first device 702 and a second device 704 are in communication. Device 702 may be, for example, an access node 104 such as an eNodeB, while device 704 may be a WCD 106, such as a UE. In this example, each device 702,704 includes an RRC, RLC, and MAC layer. At sequence 706, device 704 receives an RLC transmission that includes data and a request for status information ("poll"). At sequence 708, device 704 determines status information, but does not respond to device 702 with the status; rather, a delay is introduced and the reporting is effectively "leashed." At sequence 710, the RRC layer responds to peer device 702, using the RLC layer for delivery. The status is then "unleashed," such that it may be reported back to device 702. At sequence 712, the RLC delivers the data response together with the status, using the MAC for adaption. When compared to sequence 300, which uses existing techniques, sequence 700 improves the efficient use of resources by eliminating the redundant RLC transmission 308 back to device 302 to report status. The data response and the status may be, for instance, concatenated together for transmission in sequence 712.

Figure 8:
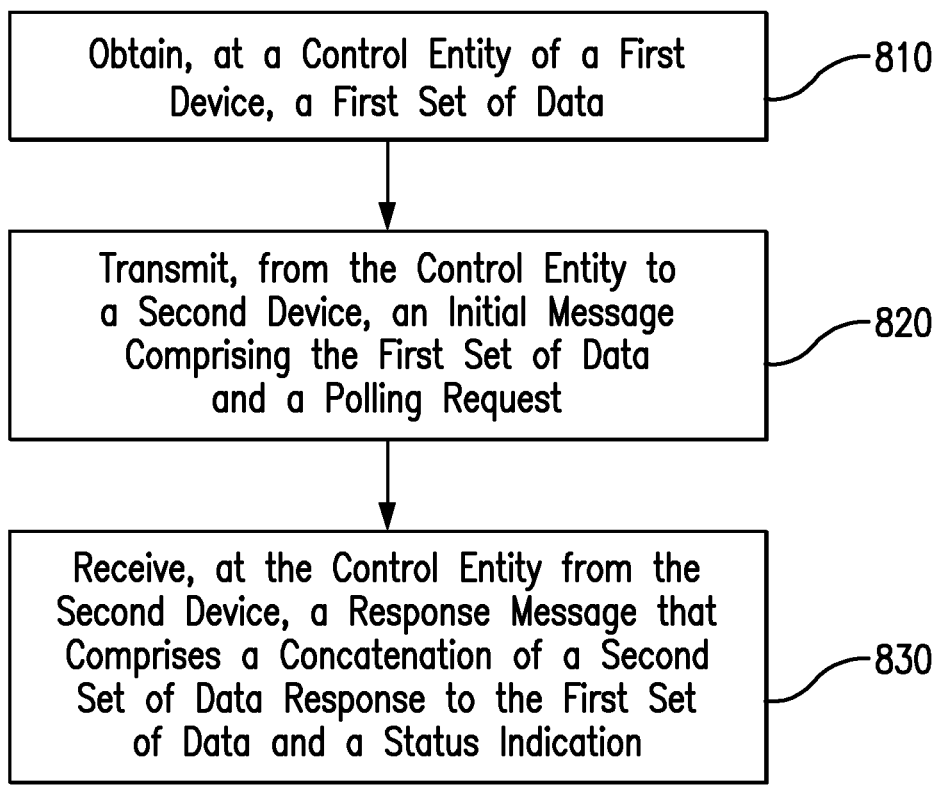
FIG. 8 is a flow chart illustrating a process in accordance with exemplary embodiments.

Certain aspects of disclosed embodiments may be implemented from the status-requesting side of the request-response model. Referring now to FIG. 8, a process 800 for requesting status information in a network is illustrated. The process 800 may be performed, for instance, by a component of a wireless communication device, access node, or control node. For instance, the process 800 may be performed by a control entity of wireless communication device 106, access node 104, or control node 108.

In step 810, a control entity of a first device obtains a first set of data. The data may be obtained, for instance, by receiving it from another entity or device, or alternatively, the data may be determined or otherwise developed by the control entity.

In step 820, the control entity transmits the data to a second device, along with a polling request. The message may be communicated, for instance, on the RLC layer. In some embodiments, the message may be a PDU or PDU segment that includes an indicator request status, where the data may be decoded in a higher layer of the second device as an RRC message.

In step 830, the control entity of the first device receives a responsive message from the second device that is a concatenation of a second set of data, which is responsive to the first set of data, and an indication of the second device's status.

According to some embodiments, a delay in status reporting may be accomplished by omitting or delaying the corresponding request for status information. For instance, the transmitting peer device may separate a poll from the message, such as a PDU or PDU segment, that would normally contain the poll and that contains the higher layer data/request. The poll may then be sent in a subsequent message, such as a subsequent PDU or PDU segment. One of ordinary skill in the art will recognize that there are a number of subsequent PDUs that could carry the delayed poll. For instance, it may be transmitted according to the typical manner of selecting a PDU for polling, as outlined in Section 4.1.2.2 of 3GPP 36.322, e.g., by selecting the next new AMD PDU or AMD PDU segment that will be formed from the higher layer input the next RESEG PDU that will be formed from "Last Data Poll" trigger. Alternatively, the message to carry the delayed poll may be configured as a minimal, special-purpose standalone Control PDU, tailored specifically to carry a delayed poll. The time instant to send a message that carries the delayed poll may be triggered by a timer, such as a timer present in the current 3GPP specification, or a timer specifically developed for triggering a delayed request for status information.

Figure 9:
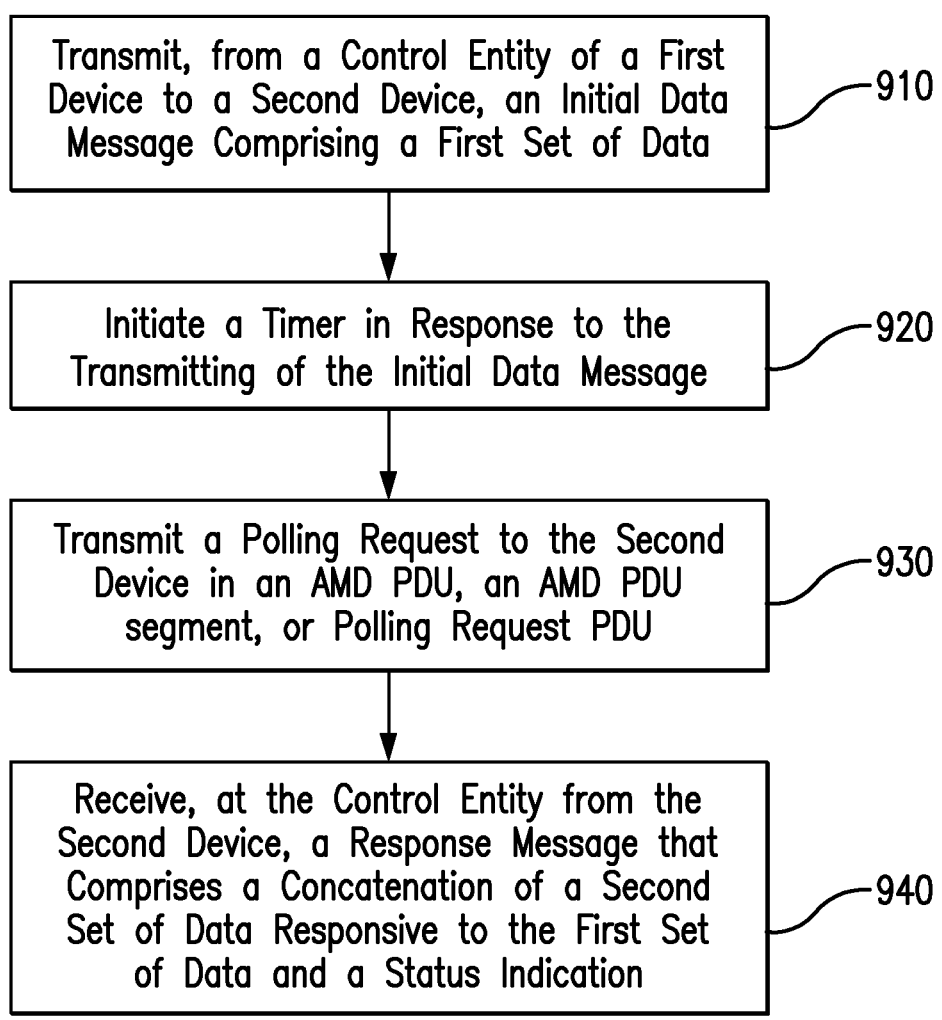
FIG. 9 is a flow chart illustrating a process in accordance with exemplary embodiments.

Referring now to FIG. 9, a process 900 for requesting status information in a network is illustrated. The process 900 may be performed, for instance, by a component of a wireless communication device, access node, or control node. For instance, the process 900 may be performed by a control entity of wireless communication device 106, access node 104, or control node 108.

In step 910, an initial data message comprising a first set of data is transmitted from a first device to second device. For instance, the message may be transmitted from an eNodeB to a UE.

In step 920, a timer is initiated in response to the transmission of the initial data message.

In step 930, a polling request is transmitted to a second device, for instance, in an AMD PDU, an AMD PDU segment, or a polling request PDU. The timing of the transmission of the polling request may be based on the timer of step 920. For instance, the expiration or specified time lapse of the timer may trigger the polling request transmission in step 930.

In step 940, a response message is received from the second device that is a concatenation of a second set of data, responsive to the first set of data, and an indication of the second device's status.

Figure 10:
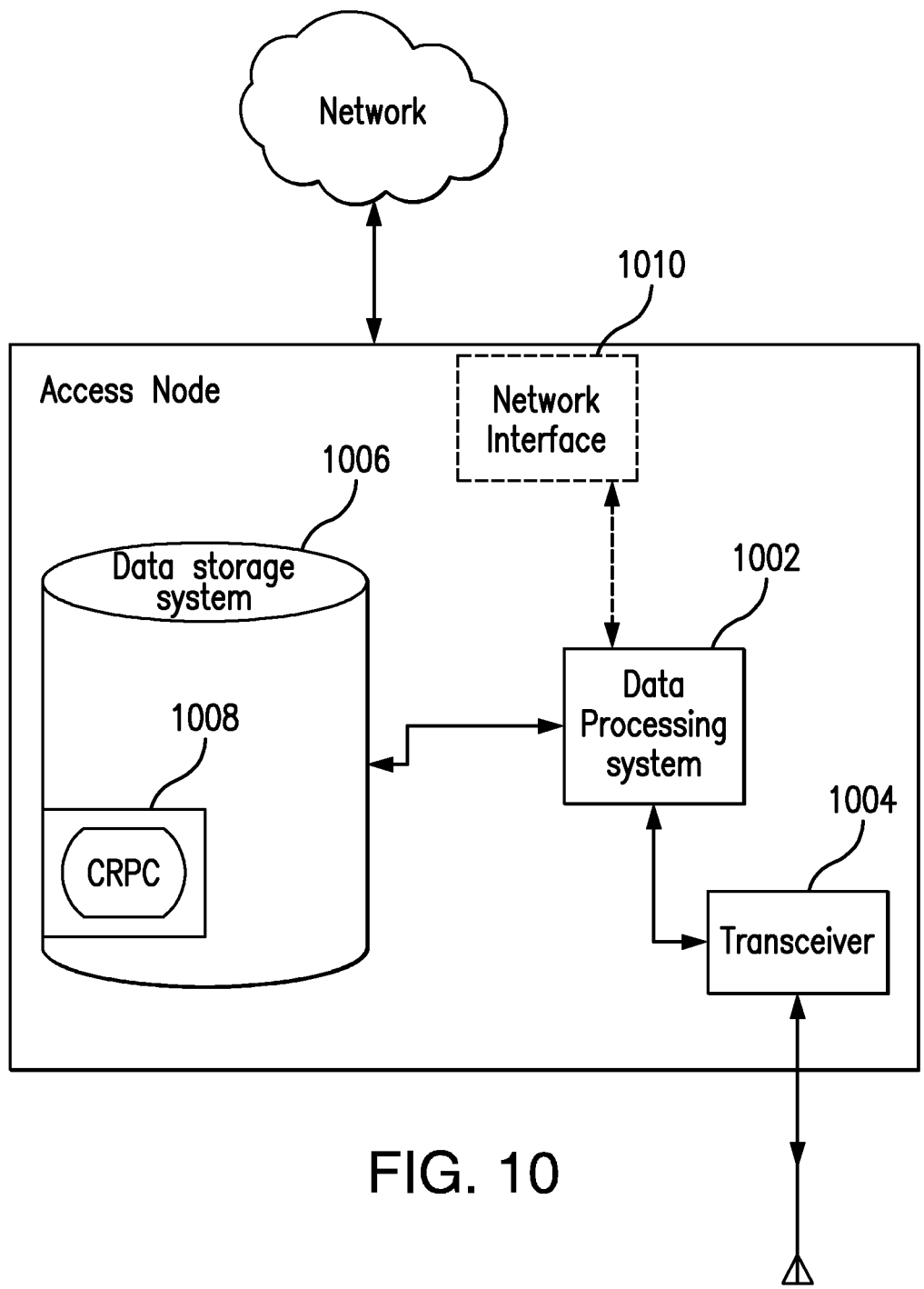
FIG. 10 is a block diagram of an access node in accordance with exemplary embodiments.

FIG. 10 illustrates a block diagram of an exemplary access node, such as node 104 shown in FIG. 1. As shown in FIG. 10, the access node 104 may include: a data processing system 1002, which may include one or more microprocessors and/or one or more circuits, such as an application specific integrated circuit (ASIC), field-programmable gate arrays (FPGAs), and the like; a network interface 1010; a transceiver 1004, and a data storage system 1006, which may include one or more non-volatile storage devices and/or one or more volatile storage devices (e.g., random access memory (RAM)). According to some embodiments, the data processing system 1002 may comprise a control unit used for selection of transmission parameters.

In embodiments where data processing system 1002 includes a microprocessor, computer readable program code (CRPC) 1008 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1002 to perform steps described above (e.g., steps described above with reference to the flow charts shown in FIGS. 5-6 and 8-9). In other embodiments, the access node 104 is configured to perform steps described herein without the need for code. That is, for example, data processing system 1002 may consist merely of one or more ASICs. Hence, the features of the embodiments described herein may be implemented in hardware and/or software. For example, in particular embodiments, the functional components of the base station described above may be implemented by data processing system 1002 executing computer instructions, by data processing system 1002 operating independent of any computer instructions, or by any suitable combination of hardware and/or software.

Figure 11:
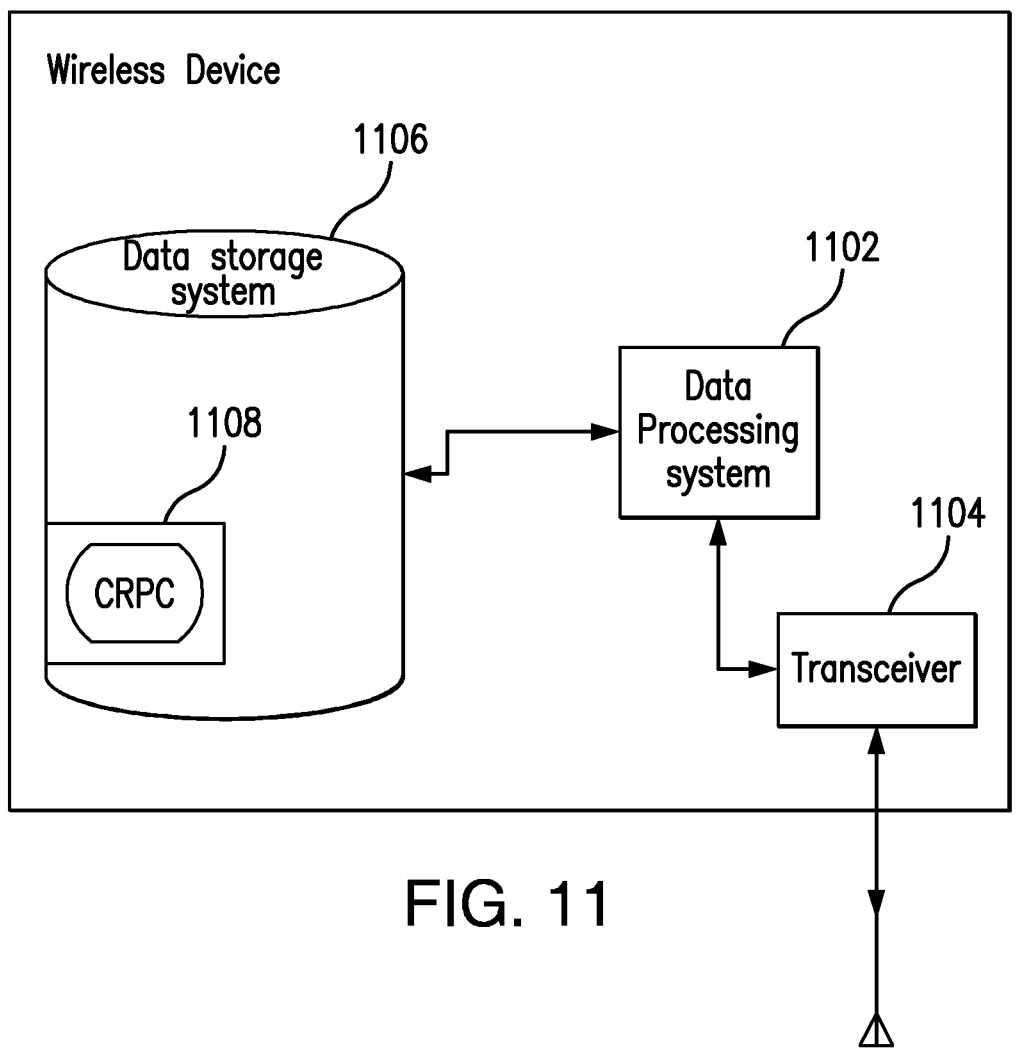
FIG. 11 is a block diagram of a wireless device in accordance with exemplary embodiments.

FIG. 11 illustrates a block diagram of an exemplary wireless device, such as device 106 shown in FIG. 1. As shown in FIG. 11, the device 106 may include: a data processing system 1102, which may include one or more microprocessors and/or one or more circuits, such as an application specific integrated circuit (ASIC), field-programmable gate arrays (FPGAs), and the like; a transceiver 1104, and a data storage system 1106, which may include one or more non-volatile storage devices and/or one or more volatile storage devices (e.g., random access memory (RAM)). According to some embodiments, the data processing system 1102 may comprise a control unit used for selection of transmission parameters.

In embodiments where data processing system 1102 includes a microprocessor, computer readable program code (CRPC) 1108 may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 1102 to perform steps described above (e.g., steps described above with reference to the flow charts shown in FIGS. 5-6 and 8-9). In other embodiments, the device 106 is configured to perform steps described herein without the need for code. That is, for example, data processing system 1102 may consist merely of one or more ASICs. Hence, the features of the embodiments described herein may be implemented in hardware and/or software. For example, in particular embodiments, the functional components of the base station described above may be implemented by data processing system 1102 executing computer instructions, by data processing system 1102 operating independent of any computer instructions, or by any suitable combination of hardware and/or software.

Figure 12:
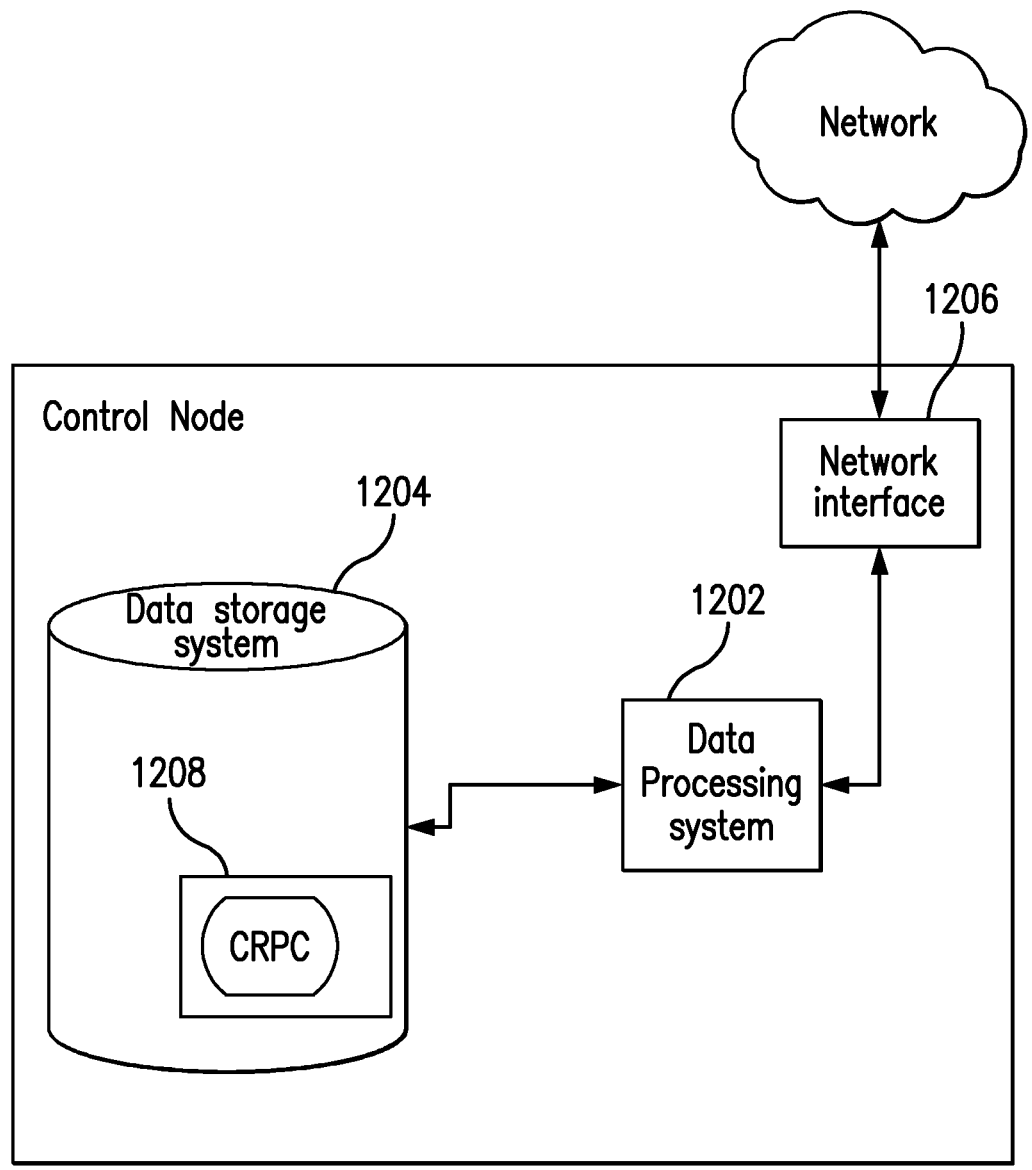
FIG. 12 is a block diagram of a control node in accordance with exemplary embodiments.

FIG. 12 illustrates a block diagram of an exemplary control node, such as node 108 shown in FIG. 1. As shown in FIG. 12, the control node 108 may include: a data processing system 1202, which may include one or more microprocessors and/or one or more circuits, such as an application specific integrated circuit (ASIC), field-programmable gate arrays (FPGAs), and the like; a network interface 1206, and a data storage system 1204, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above (e.g., steps described above with reference to the flow charts shown in FIGS. 5-6 and 8-9). In other embodiments, the control node 104 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

While various embodiments have been described above, it should be understood that they have been presented by way of example only, and not limitation. Thus, the breadth and scope of the present disclosure should not be limited by any of the above-described exemplary embodiments. For example, while much of the disclosure has been described with respect to terms and concepts applicable to s system based on the 3GPP LTE FDD technology, one of ordinary skill in the art will readily recognize the disclosed methods, devices, and computer program products are applicable to other communication systems, such as any system using overlaid control procedures of a request-response type. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first device operating in a network, the method comprising:
   receiving a status request from a second device operating in the network, wherein the first and second devices implement peer protocol stacks for communicating with each other and the status request requests status information for a first protocol layer of the protocol stack implemented by the first device;
   receiving first data from the second device, wherein the first data targets a higher, second protocol layer of the protocol stack implemented by the first device;
   passing the first data upward from the first protocol layer towards the second protocol layer, for processing by the second protocol layer;
   determining status information at the first protocol layer, for responding to the status request; and
   transmitting the status information to the second device together with at least a portion of second data produced by the second protocol layer in response to the first data, if the second data becomes available at the first protocol layer before reaching a maximum delay defined for responding to the status request, and otherwise, upon reaching the maximum delay, transmitting the status information to the second device without the second data.

2. The method of claim 1, further comprising timing the maximum delay via a timer at the first device and starting or restarting the timer responsive to receiving the status request.

3. The method of claim 1, wherein the status request and the first data are received together in a message sent from the second device to the first device.

4. The method of claim 1, wherein the status request and the first data are included in a Protocol Data Unit (PDU) of the first protocol layer, and wherein passing the first data upward from the first protocol layer towards the second protocol layer comprises sending a Service Data Unit (SDU) upward in the protocol stack from the first protocol layer.

5. The method of claim 1, further comprising receiving the second data in a Service Data Unit (SDU) passed down in the protocol stack to the first protocol layer, and wherein transmitting the status information together with the second data comprises forming a Protocol Data Unit (PDU) of the first protocol layer and including the status information and at least a portion of the second data, for transmission to the second device.

6. The method of claim 1, wherein the first protocol layer is a Radio Link Control (RLC) protocol layer and the second protocol layer is a Radio Resource Control (RRC) protocol layer, and wherein the status request comprises a polling bit included in an Acknowledged Mode Data Protocol Data Unit (PDU) or PDU segment of the RLC protocol layer and sent from the second device.

7. The method of claim 6, wherein the first data comprises RRC reconfiguration data and the second data comprises corresponding reconfiguration response data.

8. The method of claim 1, wherein the first device comprises a wireless communication device communicating with a network node as said second device, said network node belonging to a wireless communication network as said network.

9. A device configured for operation in a network, the device referred to as a first device and comprising:
   a transceiver; and
   processing circuitry configured to:
      receive, via the transceiver, a status request from a second device operating in the network, wherein the first and second devices implement peer protocol stacks for communicating with each other and the status request requests status information for a first protocol layer of the protocol stack implemented by the first device;
      receive, via the transceiver, first data from the second device, wherein the first data targets a higher, second protocol layer of the protocol stack implemented by the first device;
      pass the first data upward from the first protocol layer towards the second protocol layer, for processing by the second protocol layer;
      determine status information at the first protocol layer, for responding to the status request; and
      transmit the status information to the second device together with at least a portion of second data produced by the second protocol layer responsive to the first data, if the second data becomes available at the first protocol layer before reaching a maximum delay defined for responding to the status request, and otherwise, upon reaching the maximum delay, transmit the status information to the second device without the second data.

10. The first device of claim 9, wherein the processing circuitry is configured to time the maximum delay via a timer and start or restart the timer responsive to receiving the status request.

11. The first device of claim 9, wherein the status request and the first data are received together in a message sent from the second device to the first device.

12. The first device of claim 9, wherein the status request and the first data are received in a Protocol Data Unit (PDU) of the first protocol layer, and wherein the processing circuitry is configured to pass the first data upward from the first protocol layer towards the second protocol layer by sending a Service Data Unit (SDU) upward in the protocol stack from the first protocol layer.

13. The first device of claim 9, wherein the processing circuitry is configured to receive the second data in a Service Data Unit (SDU) passed down in the protocol stack to the first protocol layer, and to transmit the status information together with the second data by forming a Protocol Data Unit (PDU) of the first protocol layer and including the status information and the second data, for transmission to the second device.

14. The first device of claim 9, wherein the first protocol layer is a Radio Link Control (RLC) protocol layer and the second protocol layer is a Radio Resource Control (RRC) protocol layer, and wherein the status request comprises a polling bit included in an Acknowledged Mode Data Protocol Data Unit (PDU) or PDU segment of the RLC protocol layer and sent from the second device.

15. The first device of claim 14, wherein the first data comprises RRC reconfiguration data and the second data comprises corresponding reconfiguration response data.

16. The first device of claim 9, wherein the first device comprises a wireless communication device configured for operation in a wireless communication network as said network, and wherein the first device is configured to communicate with a network node in the wireless communication network as said second device.

* * * * *